United States Patent [19]
Koch et al.

[11] 3,773,586
[45] Nov. 20, 1973

[54] METHOD OF PROCESSING SYNTHETIC PLASTIC MATERIALS FOR SUBSEQUENT EXTRUSION AND REGENERATION

[75] Inventors: Heinrich Koch, Jakobstr. 88; Heinz Staneck, both of Siegburg, Germany

[73] Assignee: said Koch, by said Staneck

[22] Filed: Mar. 4, 1971

[21] Appl. No.: 120,870

[52] U.S. Cl................. 156/193, 156/250, 264/37
[51] Int. Cl.... B31c 13/00, B32f 31/18, B29h 19/00
[58] Field of Search ........................ 156/190–191, 193, 250, 251; 264/37

[56] References Cited
UNITED STATES PATENTS

| | | | |
|---|---|---|---|
| 3,673,030 | 6/1972 | De La Naulte et al............. | 156/193 |
| 2,840,137 | 6/1958 | Wortz................................... | 264/37 |
| 2,928,133 | 3/1960 | Schairer.............................. | 264/37 |
| 3,238,284 | 3/1966 | Sutton................................. | 264/37 X |

Primary Examiner—Philip Dier
Attorney—Walter Becker

[57] ABSTRACT

A method of treating foil webs and strips of synthetic material preparatory to feeding the same to an extruder for regeneration, according to which the foil web or strip is in a continuous manner wound upon a grate roller and with increasing thickness on said roller is, while being subjected to pressure from the outside, cut into individual sections while simultaneously said layers are at their cut edges fused to each other layer by layer, said layers being pressed through between the grate bars of said grate roller into the interior of said grate roller, thereby to form strands and the thus formed strands being withdrawn by conveying means and cut into multi-layer pieces and being subsequently conveyed to a supply station or station for further processing the thus obtained material.

1 Claim, 4 Drawing Figures

Patented Nov. 20, 1973　3,773,586

INVENTORS:
Heinrich Koch
Heinz Staneck

By
Walter Becker

METHOD OF PROCESSING SYNTHETIC PLASTIC MATERIALS FOR SUBSEQUENT EXTRUSION AND REGENERATION

The present invention relates to a method of pretreating webs or strips of foils of synthetic material for subsequent treatment in an extruder.

When producing foils of synthetic material, it may happen that the foil does not meet the customer's requirements either as to its appearance or its structure. Such rejects, however, can be regenerated and can be worked in a new process to furnish foil material which will meet the requirements of the respective customer. In other words, with the methods set forth above, no rejects are obtained which cannot be regenerated.

When processing foils of synthetic material, frequently larger quantities of rejects are obtained which can likewise be regenerated and reworked to new foils.

A number of methods have become known for purposes of regenerating foil material which is not usable during the production and processing operations. According to one of these known methods, the foil web is first diminished and is then mixed in a dry mixture until, as a result of the frictional heat, a granular agglomerate is obtained. This agglomerate can then again be worked into foil material. The drawback of this method consists in that it is not a continuous process because the mixing process has to be checked very carefully by the operator and must be controlled accordingly. In this connection there exists the danger that, if the frictional heat development becomes too great, not the desired starting product is obtained but a granular agglomerate.

According to another heretofore known method, the foils or foil residues are first melted in an autoclave or digester and are processed to form a granulate. This method, however, is dependent on the type of the synthetic material and therefore can be used only within certain limits.

Starting from the drawbacks of the above mentioned heretofore known methods, it is an object of the present invention to provide a method of regenerating webs and strips of synthetic material which will eliminate any manual manipulations and which will operate in a continuous manner.

This object and other objects and advantages of the invention will appear more clearly from the following specification in connection with the accompanying drawings in which:

FIG. 1 diagrammatically illustrates a regenerating plant for practicing the method according to the present invention.

Figure 1:
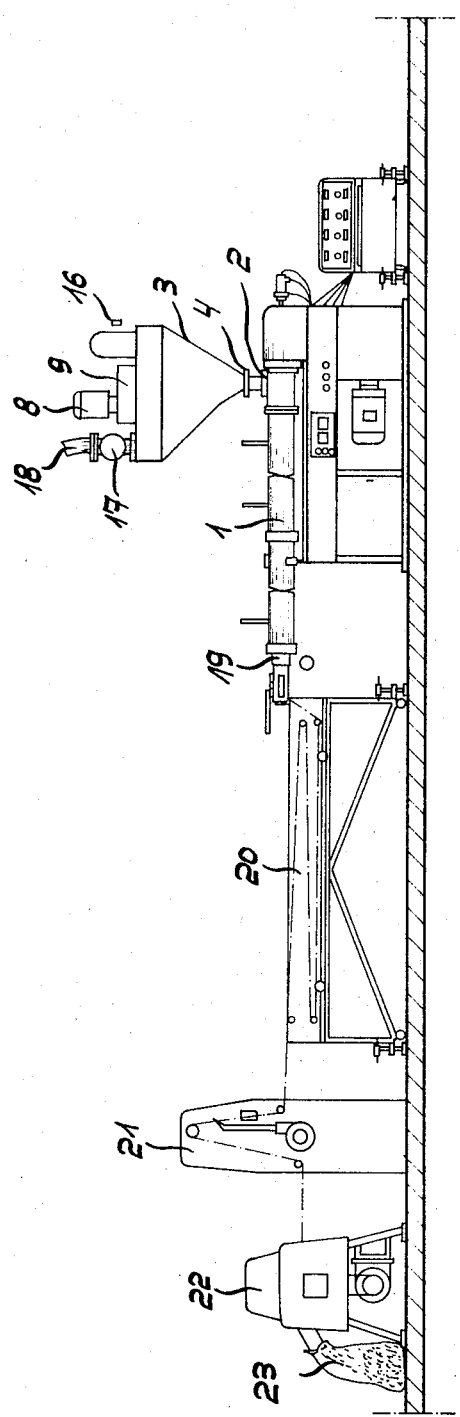

The method according to the present invention is characterized primarily in that a foil or strip of synthetic material is in a continuous manner wound upon a grate roller and with increasing layer thickness is by means of one or more pressure rollers at the outer edges of the grate bars separated into individual sections while simultaneously at the separating edges the layers are fused together and during the continuous winding-up operation are pressed through grate elements so that corresponding strands are formed which, when entering the interior of the grate roller, are grasped by a conveying element with cutting portion, preferably a worm, and are separated into multi-layer pieces which subsequently are conveyed to a supply or storage place or to a further processing station.

The advantage of this new method consists in that webs of foils of any desired width are by preceding folding means wound onto the grate roller while this operation is effected automatically. The preparatory treatment of the wound-up foil webs is effected by means of pressure rollers on the outside of the grate roller. During the continuous winding-up movement and the thus increasing layer thickness, the pressure rollers, will in cooperation with the outer edges of the grate element which are heated, bring about a cutting into individual pieces which in their turn, in view of the heat development and in view of the further inward movement toward the interior of the grate roller, will be fused together at the rotating edges.

In this way due to the pressing action, strands are formed from the continuously fused together foil sections or pieces, which strands have a cross-section corresponding to the free grate cross-sections. The strands are pressed into the interior of the grate roller and here are by means of a conveying device with cutting portion transported to a supply station or a processing station, for instance, the regenerating extruder. The entire operation no longer requires any manual work. The foil is wound automatically from a roller onto the grate roller and there is regenerated in conformity with the desired regeneration as described above.

Referring now to the drawings in detail, a regenerating plant for practicing the method according to the present invention comprises a regenerating extruder 1 having an inlet 2 to which is firmly connected a funnel-shaped supply or storage container 3. The connection between the extruder 1 and the supply container 3 is effected by a flange-like intermediate member 4. In the container 3 there is provided a worm 5 which tapers toward the extruder inlet 2. The worm 5 has an upwardly extending shaft 6 on which is mounted an agitator mechanism 7 for rotation with the worm 5. Worm 5 with agitator mechanism 7 is driven by a motor 8 through an interposed transmission 9. To safeguard the motor 8 in case the worm 5 is overloaded, there is provided a limit switch 10 which in such instance will turn off the motor 8. The foil material to be regenerated in the extruder 1 is first protreated in a grate roller 11 with pressure roller 12. The pretreatment of the foils 13 entering in the direction of the arrow F is effected in such a way that by means of the grate roller 11 the foil web or foil strip is cut into individual sections while in view of the continuous winding-up of the web or strip material in cooperation with the heated grate bars, the cut off or separated sections are pressed against each other layer for layer and are fused to each other at the cutting edges. The thus fused together sections are, through the free grate cross-sections 14, pressed in the form of a strand into the inner chamber 15 of the grate roller and from there are conveyed into the supply container 3 by standard tearing and conveying means. For purposes of checking the feeding of the material to be processed to the grate roller, a photoelectric cell 16 is provided serving as band checking means. The photoelectric cell 16 is coupled electromechanically to the rotary trap device 17 in such a way that when the band or strip tears off whereby automatically the supply of pretreated foil material to the container 3 is interrupted, the device 17 is automatically turned on and conveys through a pipe line 18 connected to a non-illustrated silo, for instance, polyethylene granulate or a polyvinylchloride mixture into the container 3. In this way it will be assured that the worm of the extruder 1 can always sufficiently be supplied with synthetic material so that a burning of the material will be prevented. As soon as the web or strip of foil material is again threaded into the grate roller 11, the device 17 will turn off.

Figure 2:
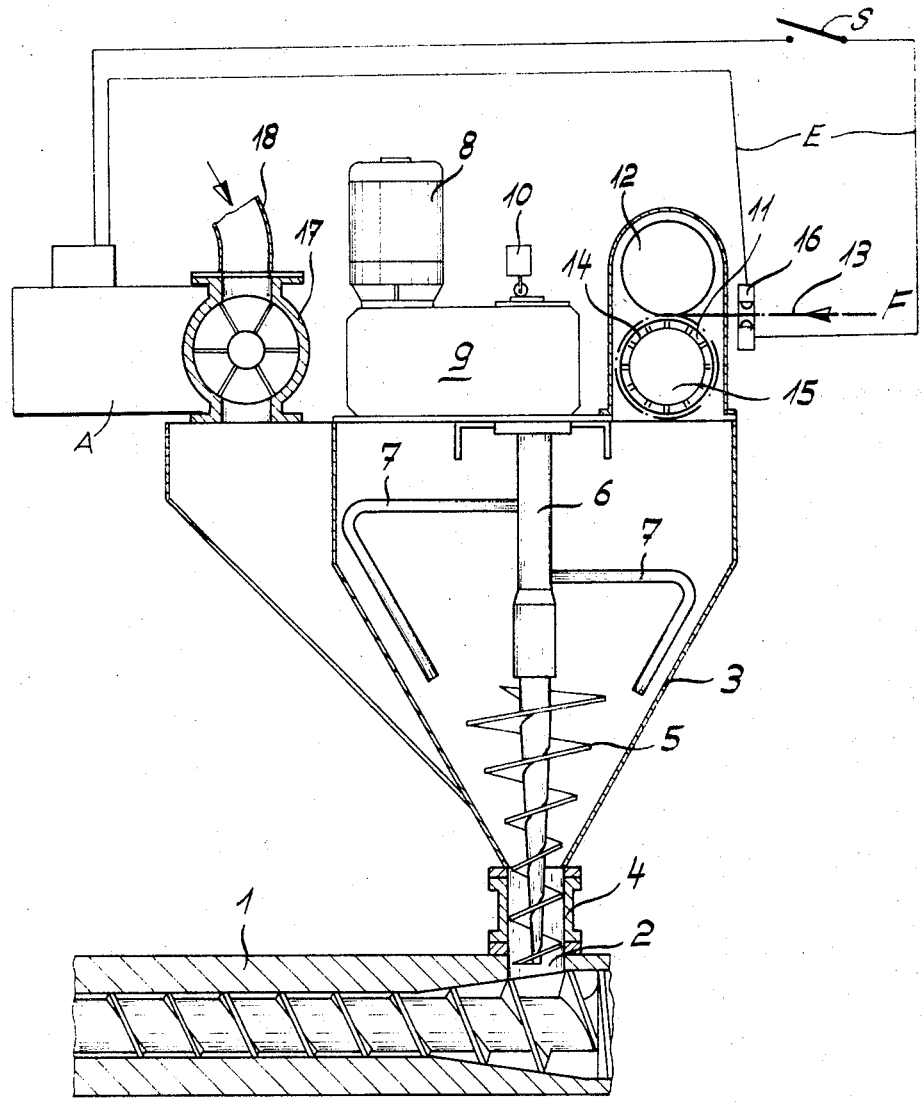
FIG. 2 illustrates on a somewhat larger scale than FIG. 1 a portion of the extruder of the plant of FIG. 1 together with the auxiliary devices associated therewith.

Circuitry in FIG. 2 shows the photocell 16 connected by way of electrical lines E with a drive means A for the rotary trap device 17. So long as the foil path 13 runs through the photocell 16 there is to be noted that the switch S of the line E is open. If the foil path 13 tears off whereby simultaneously the passage through the photocell 16 is interrupted, then switch S operates and closes the circuit for the drive means A of the rotary trap device 17. Immediately by way of the tubular conduit 18 and cellular wheel accelerating means or rotary trap device 17 there is supplying of polyethylene granulate or polyvinylchloride mixture is supplied or forwarded into the supply hopper or container 3.

If a disorder occurs in the operation of the plant or calendar or if a change in the calender is to be effected, the extruder has to be stopped for a shorter or longer period of time. During a short interruption, the device 17 feeds corresponding PVC-material to the extruder. If a longer standstill period of the extruder is necessary, there exists the danger that the PVC-material in the extruder will in view of the longer stay be destroyed as far as its chemical structure is concerned and can no longer be used. In such an instance, instead of the PVC-material, high pressure polyethylene is supplied by the device 17 which material is non-sensitive against a longer stay in the worm. After the calender has again been started and strip material is again pressed into the extruder while the worm is in continuous operation, the oncoming PVC-material will press th polyethylene in the worm out of the latter. After a short period of operation, it is again possible to process polyvinylchloride foils in a continuous operation.

The material regenerated in the extruder 1 is discharged through a nozzle head 19 in the form of a band and is then passed through a water bath 20. Subsequently, the thus regenerated material is conveyed over a drying path 21 and from there is passed into a granulator 22 which is coupled to a packing or wrapping device which automatically closes the sack or bag 23 filled with granulate.

If the strip material directly coming from the calender is processed in the plant according to the present invention, the strand discharged through the nozzle head 19 of the extruder 1 can be directly conveyed to the calender for the purpose of making new foils.

Figure 3:
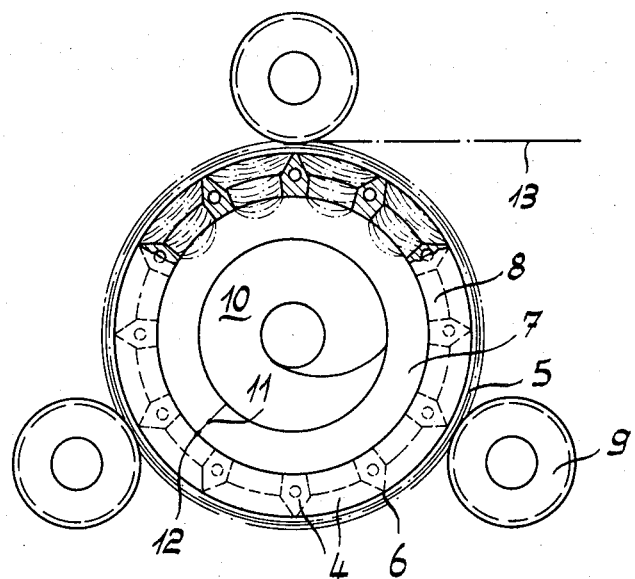
FIG. 3 represents a section through a grate roller for use in connection with the plant of FIG. 1, said section being taken along the line III—III of FIG. 4.
Figure 4:
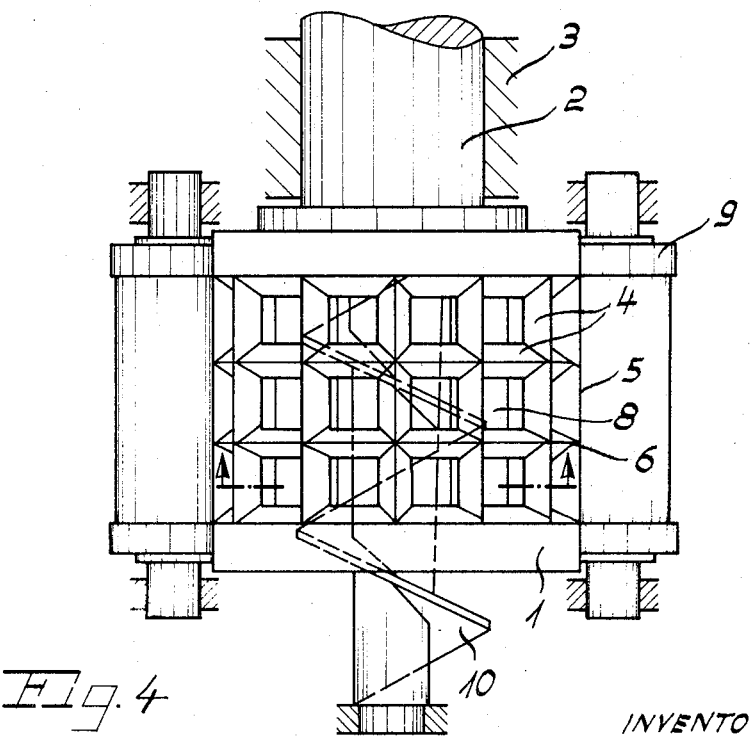
FIG. 4 is a view of FIG. 3 as seen in the direction of the arrow A in FIG. 3.

As shown more specifically in FIG. 4, the grate roller 11 is journalled at 3 by means of a shaft 22. Grate roller 11 comprises bars 24 which at their surface 25 have a sharp edge 26 and which have a cross-section that increases toward the inner chamber 15 of the grate roller. The enlargement of the cross-section of the grate bars 24, as is particularly clearly shown in FIG. 3, extends in this embodiment over a certain length only and then remains constant. Regardless of whether the increase in cross-section of the bars of grate roller 11 toward the interior 15 of the grate roller is continuous over the entire thickness of the roller or only over a portion thereof and then is constant, free passages 28 are formed which in view of the configuration of the cross-section of the bars 24 of the grate roller are funnel-shaped or taper. As will be evident from FIG. 4, the bars or webs 24 are so arranged with regard to each other that free passages of square cross-section are formed. The arrangement of the bars 24 may, however, also be such that passages of different cross-section, for instance, rectangular, oval or circular cross-section, are formed. The rectangular or square cross-section, however, is preferred. The pressure rollers 12 co-operate with the grate roller 11 and are offset with regard to each other by 120° as is best seen in FIG. 3. There exists, of course, also the possibility to employ only one or more than three pressure rollers 12. A conveyor, preferably a worm 30, cooperates with the grate roller 11. Worm 30 extends into the interior 15 of the grate roller and has its largest diameter D so dimensioned that a free space 31 is formed between the worm 30 and the inner configuration 11a of the grate roller.

The operation is as follows: The web of foil 13, for instance, a web of polyvinylchloride is wound onto the grate roller 11, and in view of the continuously increasing layer thickness is pressed against the edges 26 of the bars 24 of the grate roller whereby the foil web is cut into individual sections. This cutting or division is facilitated by a heating effect produced by the bars 24. Simultaneously with the separation into individual foil sections at the edges 26 of the webs or bars 24, a fusing of the individual superimposed layers takes place which is aided by the corresponding configuration of the bars 24 and the formation of tapered free passages 28. During the continuous winding-up of the foil web 13 onto the grate roller 11 and the thus inherent separation of the web 13 into separate sections, individual strands 34 (FIG. 3) are formed which move through the free passages 28 of the grate roller 11 into the interior chamber 15 of the grate roller. Here the individual strands are grasped by the worm 30 and are divided into individual package-like structures and are subsequently conveyed to a supply or further processing station.

The heating up of the grate rollers may be effected in any suitable manner. For instance, the bars 24 may be provided with bores 35 through which heated-up oil is passed or into which heated-up rods or wires extend. The temperature of the grate bars 24 is such that the working of the foil is effected at temperatures of from 90° to 100° C.

In this way foil bands of any width can be processed. Prior to the bands hitting the grate rollers 11, the bands 13 must be laterally gathered if they are wider than the width of the grate roller. These steps, however, can be easily effected.

It is also advantageous that the entire winding-up and separating process can be so coupled with the discharge step that no more material is discharged than is wound up and divided into sections.

It is, of course, to be understood that the practicing of of the method according to the present invention is not limited to the specific device shown in the drawings and that the method is not limited to the specific steps

We claim:
1. A method of processing of synthetic plastic materials to prepare the same for subsequent extrusion for recycling and regeneration into new foil webs and foil strips of synthetic material, which includes the steps of: winding the material to be processed in a continuous manner into a multi-layer coil of increasing magnitude, cutting the superimposed coils into strips to form strands having cut edges by use of a heated separating means and fusing them under pressure layer for layer to each other at the cut edges, cutting the thus formed strands into multi-layer pieces, and feeding the thus cut pieces into conveying means for conveying the material to a desired station.

* * * * *